ELECTRICALLY HEATED SOLDERING DEVICE

Filed April 10, 1964

7 Sheets-Sheet 1

INVENTOR.
NICHOLAS ANTON
BY
Charles B. Cannon
His Atty.

April 25, 1967 N. ANTON 3,316,385

ELECTRICALLY HEATED SOLDERING DEVICE

Filed April 10, 1964 7 Sheets-Sheet 2

INVENTOR.
NICHOLAS ANTON
BY Charles B. Cannon
His Atty.

INVENTOR.

NICHOLAS ANTON

BY Charles B. Cannon

His Atty.

ELECTRICALLY HEATED SOLDERING DEVICE

Filed April 10, 1964 7 Sheets-Sheet 4

INVENTOR.
NICHOLAS ANTON
BY
Charles B. Cannon
His Atty.

ELECTRICALLY HEATED SOLDERING DEVICE

Filed April 10, 1964 7 Sheets-Sheet 5

INVENTOR.
NICHOLAS ANTON
BY
Charles B. Cannon
His Att'y

INVENTOR.
NICHOLAS ANTON
BY
Charles B. Cannon
His Att'y

INVENTOR.
NICHOLAS ANTON
BY
Charles B. Cannon
His Att'y.

United States Patent Office 3,316,385

Patented Apr. 25, 1967

3,316,385

ELECTRICALLY HEATED SOLDERING DEVICE

Nicholas Anton, Park Ridge, Ill., assignor to Wen Products, Inc., Chicago, Ill., a corporation of Illinois Filed Apr. 10, 1964, Ser. No. 358,760
11 Claims. (Cl. 219—236)

This invention relates to an electrical soldering device and tip assembly therefor.

In general, soldering devices of the prior art have been of three types, namely, (1) the so-called soldering "iron" which embodies a copper heating element to which heat is supplied from an external source, such as a gas torch; (2) the electrically heated soldering iron which embodies a resistance heating element, and in which heat is conveyed to the tip by conduction through the body of the iron and thence to the work; and (3) the so-called electrical soldering gun which includes a step-down transformer having a low voltage, high amperage, secondary winding, and a soldering tip which forms an integral electrically conductive portion of the secondary circuit of the unit and this tip is commonly made of an electrically conductive metal, such as copper, which also functions as the resistance and heating material. In such soldering guns, the heat is generated by the passage of a low voltage, high amperage electrical current directly through the soldering tip so as to heat the outer end portion thereof and the work to which the soldering tip is applied.

In the prior soldering guns, the tip employed is commonly copper, which, considering its cost, is an ideal metal for such tips, in that it transfers heat rapidly to the work, and has high heat conductivity, which is highly desirable for soldering operations.

Also, the temperature coefficient of resistance of the tip of such copper-tipped soldering guns produces a so-called automatic temperature regulation thereof, in that the electrical resistance of the copper tip is such that it increases with the temperature of the copper, with the result that as the current flow in the copper tip becomes greater, the temperature increases proportionately so that as the soldering tip becomes hot, and the resulting higher electrical resistance thereof keeps the current flow from becoming too high, and, conversely, when the tip is placed in contact with the work, and is cooled thereby, its electrical resistance is lowered, with the result that more current will flow through the tip, thereby increasing its temperature. This is known as the automatic valve action of soldering guns embodying such copper tips.

However, such prior soldering device or guns have had a number of inherent disadvantages, and among these have been the following: (1) they conduct substantial quantities of heat from the tip back to the transformer unit and handle; (2) they are inconvenient to use for fine work in the electronic arts, as in soldering fine circuitry and in other and like places; (3) they require substantial quantities of expensive copper wire; (4) they require a copper tip having an end portion of smaller cross section than the body of the tip, and, even with such constructions, the copper tip assembly transfers back a considerable volume of heat, that is, the heat is not localized as effectively as is desirable and is, in part, lost by conduction; (5) the tips of such soldering devices require abrasive cleaning from time to time and this causes gradual erosion of the tip with some deleterious effect on its heating time and heat capacity characteristics; (6) it is necessary to change or replace the tips of such soldering devices from time to time and to clamp the tip in position of use by suitable clamp means; and (7) the weight of the soldering guns becomes very substantial for the amount of heat generated. By heat capacity, as used herein, is meant the capacity of the unit for generating transferable heat, not its heat storage capacity.

By reason of the foregoing and other disadvantages of prior soldering devices, a demand has arisen for a soldering device which has most, if not all, of the advantages of the prior soldering devices but none of the disadvantages thereof.

Accordingly, it is an object of the present invention to provide a new and improved soldering device which has substantially all of the advantages but none of the disadvantages of prior soldering devices, including the prior soldering guns hereinbefore referred to.

An additional object of the invention is to provide a new and improved soldering device which has a relatively high heat capacity but relatively low current consumption.

Another object of the present invention is to provide a new and improved soldering device embodying novel means for heating the soldering tip.

A further object of the present invention is to provide a new and improved soldering device which possesses substantially all of the advantages of the prior soldering devices or guns but which is substantially less expensive than such prior soldering devices.

An additional object of the present invention is to provide a soldering device which, while being capable of general use, is also capable of being inserted into and used effectively in restricted areas, such as those which are commonly encountered in soldering electronic components, and in other like places.

A further object of the present invention is to provide a soldering device the construction of which requires a minimum of relatively expensive metals and other materials.

An additional object of the present invention is to provide a soldering device embodying a casing, a novel tip assembly, including a forward extension or tip unit, which is detachably mounted on the casing of the soldering device and houses a novel insulated electrical heating coil element which forms a part of the secondary circuit of the transformer of the new soldering device, and a heating tip which is mounted in the tubular barrel of the forward extension or tip assembly and has a heat-conductive shank or rear extension portion which extends into heat exchange relation with or is surrounded by the insulated heating coil element, the parts being so constructed and arranged that when the electrical current flows through the secondary circuit of the transformer, or other current supply means, heat is generated in the insulated electrical heating coil and is transmitted through the heat-conductive rear shank portion of the soldering tip to the outer soldering tip end portion thereof to heat the latter and the work during the soldering operation.

A further object of the invention is to provide in the new soldering device novel means for effecting an electrical connection between the leads from the secondary of the transformer and the novel insulated heating coil embodied in the new soldering device.

Still another object of the invention is to provide a novel forward extension or tip assembly which is removably and replaceably mounted on the casing or housing of the new soldering device.

A further object of the invention is to provide in the new soldering device a novel construction for effectively transmitting heat from the insulated electrical heating coil to the outer or tip portion of the soldering tip element and for preventing heat loss and heat transfer from the electrical heating coil to the transformer and to the body of the housing of the new soldering device.

An additional object of the present invention is to provide a soldering device which confines substantially all of the heat generated therein to the region of the outer end portion or soldering tip portion thereof.

Another object of the present invention is to provide a soldering device which has a relatively light weight, considering its heat capacity, and especially relative to the earlier known soldering guns which have relatively high weights for their heat capacity.

An additional object of the present invention is to provide a soldering device which has substantially the same heat capacity as is commonly used in soldering devices of the prior art, but which is considerably more efficient than such earlier known devices and consequently weighs less for the same output capacity.

A further object of the invention is to provide various different forms of a soldering tip assembly which are suitable to be used with the new soldering device, but which differ from each other in certain structural features.

A still further object of the present invention is to provide a soldering tip assembly which may be advantageously used not only with ordinary soldering device step-down transformers, but in conjunction with other electric current supply devices as well.

An additional object of the present invention is to provide a soldering unit including a new form of soldering tip assembly in combination with various electrical circuits which drive or energize the heating portion of the soldering tip assembly.

Additional objects of the present invention are: to provide a soldering device which embodies a novel tip assembly, including heating means arranged therein, which is removable and replaceable at a relatively low cost; and to provide a soldering device in the use of which the volume of heat fed back from the soldering tip portion of the device to the body of the soldering gun itself is reduced to a minimum; to provide a soldering device having the advantages named above and which are incorporated into a relatively simple, but dependable and economical structure having a relatively long useful life; and to provide a soldering device of a construction such that the shape of the soldering tip itself will not affect the electrical resistance properties of the heating element; to provide a soldering device of a construction in which the cross-sectional area of the heating coil element is substantially smaller than the cross-sectional area of the remaining portions of the secondary circuit; to provide a construction which includes a heating element in the form of a coil of electrically insulated and highly electrically conductive wire; and to provide a construction in which the soldering tip assembly includes a soldering tip proper, a heating coil in intimate heat exchange relation thereto, and electrical insulation between the heating element and the soldering tip, and in which these components are maintained in this relation and thermally insulated from the other parts of the new soldering device.

By "highly electrically conductive wire" or "low electrical resistance material" as used herein, and as used in the claims, is meant not only the copper and/or coated copper or copper alloy wires described at length herein for use in the present invention, but also other materials having high electrical conductivities or low electrical resistances. Thus, it will be recognized that although all materials have some electrical resistance, and the amount of resistance depends on the amount and configuration of the material, materials of the type referred to above are spoken of as low resistance materials, even though, as is apparent to those skilled in the art, such materials may, when used in a portion of the electrical circuit, act as resistors in the sense that they furnish at least some electrical resistance, and in some cases furnish more electrical resistance than other portions of the circuit which have less resistance by reason of their having different physical characteristics, such as cross sectional dimensions, length, or the like.

The foregoing and other objects of the present invention will be apparent when considered in conjunction with the description of the preferred embodiments of the present invention, which illustrate the principles of the present invention and the manner of applying them and what I now consider to be the best manner of constructing and using my invention, and the foregoing and other objects and advantages of the invention are described in the accompanying specification and are shown in the accompanying drawings in which.

Figures 1, 2, 3:
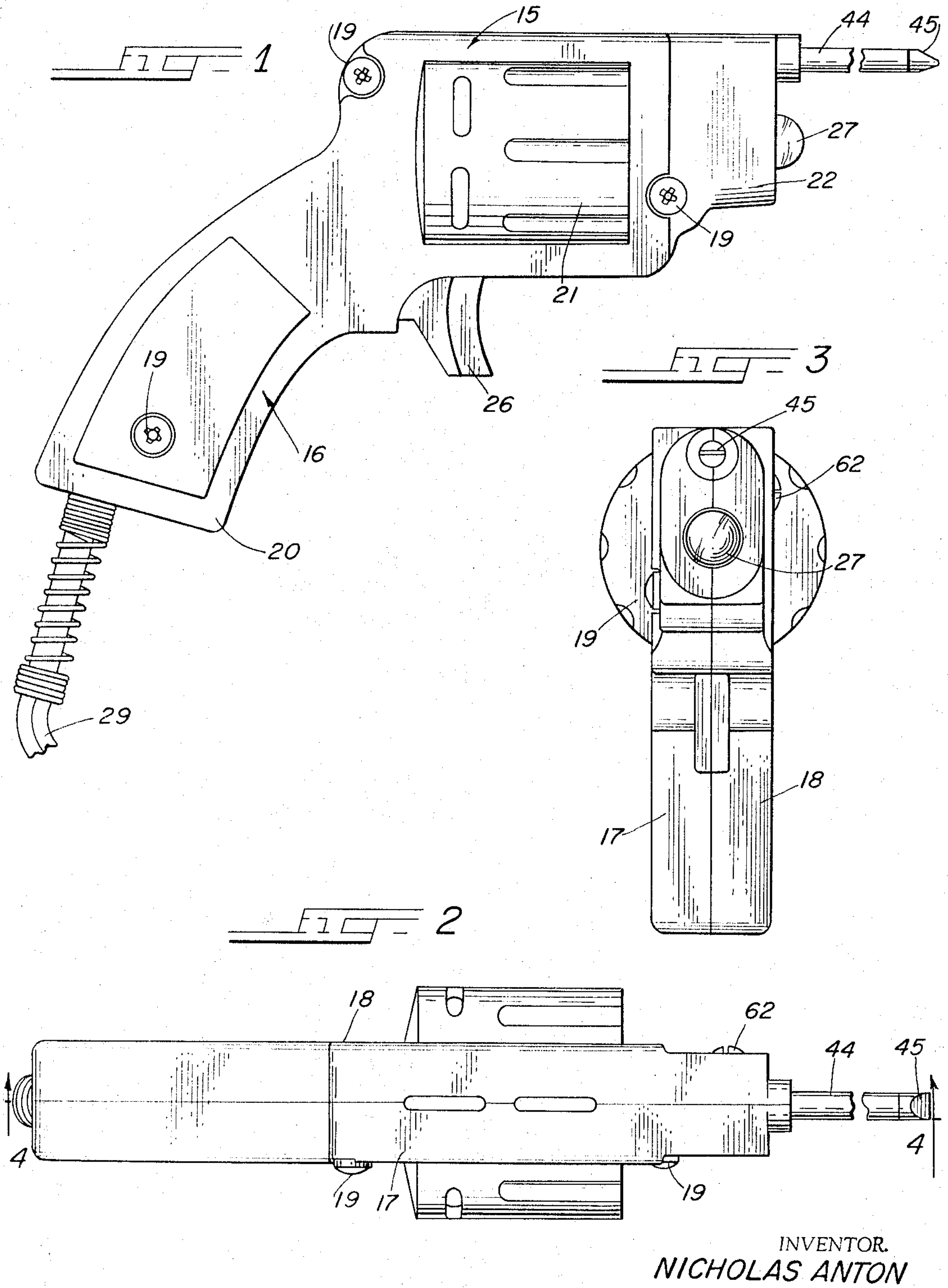
FIG. 1 is a side elevational view of a soldering device embodying the present invention with a portion of the heating tip assembly thereof broken away.
FIG. 2 is a top plan view, of the soldering device shown in FIG. 1 with a portion of the heating tip assembly thereof broken away.
FIG. 3 is a front end elevational view of the soldering device shown in FIGS. 1 and 2.

A preferred embodiment of the new soldering device is illustrated, for example, in FIGS. 1 to 12, inclusive in the drawings, wherein it is generally indicated at 15, and the device comprises a casing or housing 16, which is generally in the form of a pistol, and comprises two complementary sections 17 and 18 which are removably fastened together by suitable fastening elements in the form of screws 19.

The casing 16 includes a handle section 20, an intermediate transformer housing section 21, and a forwardly extending supporting section 22 which will be described in further detail hereinafter.

A suitable switch unit 23 is arranged within the handle section 20 and comprises a relatively stationary or fixed switch contact member 24 and a relatively movable switch contact member 25, the switch members 24 and 25 being connected by suitable conductors 27 and 28, respectively, to a flexible conductor cord unit 29 which is adapted to be connected to a suitable current source, such as a 110 volt A.C. line. A manually operable trigger member 26 is movably mounted in the handle section 20 of the casing 16 and controls operation of the movable switch contact member 25.

A step-down electrical transformer unit 30 is mounted in the intermediate housing section 21 and comprises a core 31, a primary winding 32, and a secondary winding 33, all of which will be described in further detail hereinafter.

The transformer unit 30 further includes an upwardly extending front leg 64, a center leg 34, and a rear leg 35, and a top portion 36 which is disposed across the top of the legs 63–34–35, all of said parts 64–34–35–36 being made of magnetically permeable material. The primary winding 32 of the transformer unit 30 includes a large number of turns of fine wire in the form of a copper wire of a diameter of about .0108 inch (so-called No. 30 wire) and the secondary winding 33 comprises a smaller number of turns as, for example, about 45 turns of a much larger copper wire, namely, of a diameter of about .0334 inch, that is, a so-called No. 20 wire, and the respective layers of wire windings in the transformer 30 are separated from each other by suitable insulating means in the form of sheets of insulating paper or plastic resinous insulating material 37, or the like. Two rearwardly extending leads 38, 39 of the transformer unit 30 are connected, respectively, to the fixed switch contact 24 and to the relatively movable switch contact member 25 of the switch unit 23, in the handle section 20 of the new soldering pistol unit 15.

Two secondary transformer leads 40, 41 connect the ends of the secondary winding of the transformer unit 30 to an electrical coil heating element which is embodied in the novel soldering tip assembly of the new soldering device, as will be described hereinafter. The secondary leads 40, 41 are connected to a metallic forward combination supporting and contact clip member 42 and to a resilient rearward combination supporting and contact clip member 43, which are mounted on the forward supporting section 22 of the casing or housing 16 and serve as supporting members and as electrical contact members for a forwardly extending tip assembly 44, which will be described in detail hereinafter.

Figures 4, 5, 6, 7:
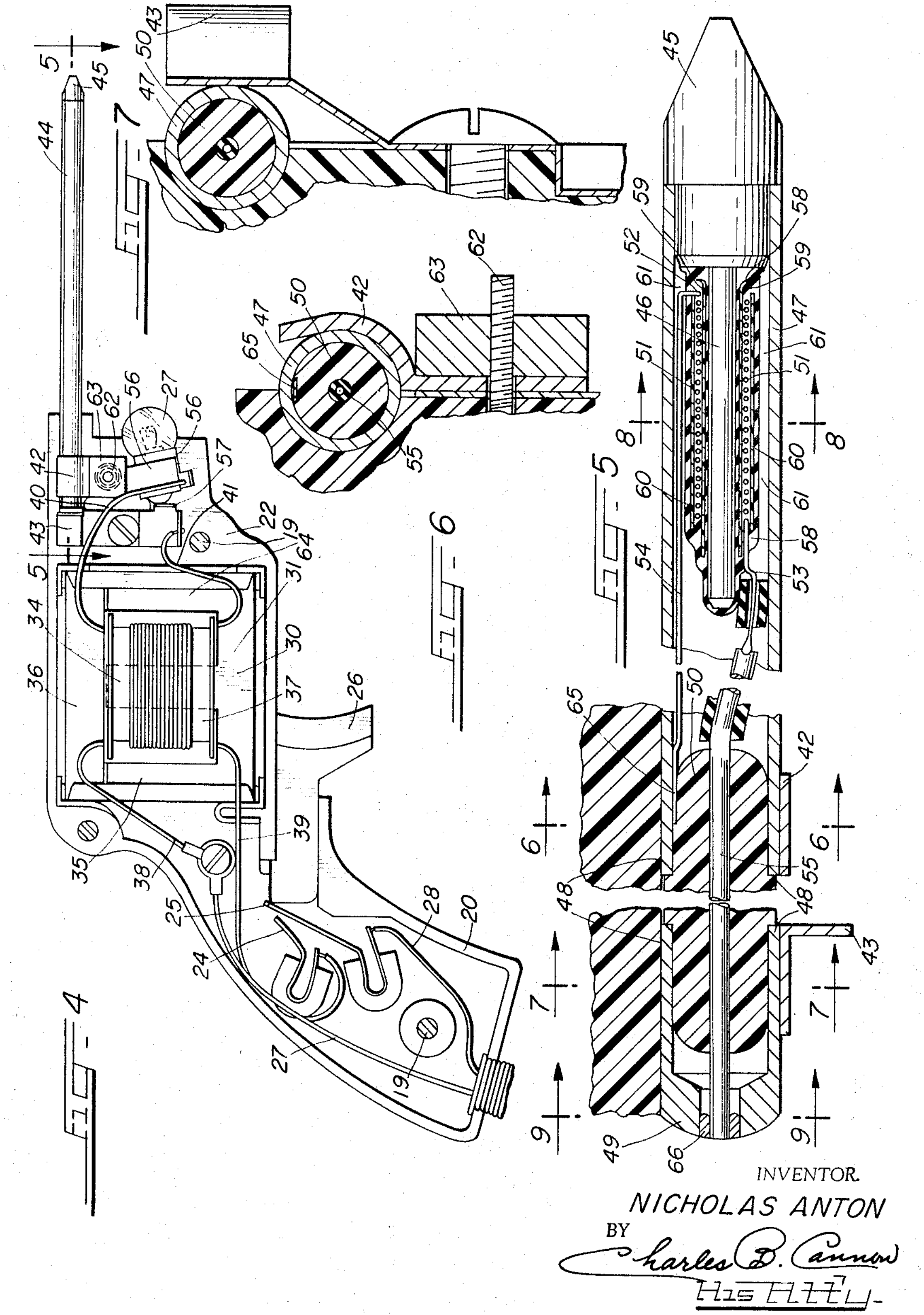
FIG. 4 is a side eleavtional view of the soldering device shown in FIGS. 1 to 3, inclusive, with part of the housing removed to illustrate the internal construction thereof.
FIG. 5 is an enlarged horizontal sectional view, with portions broken away, of the tip assembly of the new soldering device, taken on line 5—5 in FIG. 4.
FIG. 6 is a transverse vertical sectional view of a portion of the tip assembly on line 6—6 in FIG. 5.
FIG. 7 is a transverse fragmentary vertical sectional view on line 7—7 in FIG. 6, illustrating the rear portion of the tip assembly, including an electrical contact member associated therewith.

The forwardly extending tip assembly 44 is shown in detail in FIG. 5 and includes, at its forward end, a soldering tip element 45 which has a rearwardly extending heat-conductive shank portion 46. The tip element 45 is removably mounted in an elongated relatively small diameter tubular sleeve or tip housing member 47, which is embodied in the tip assembly 44, and this tubular sleeve member 47 has a rearward extension 48, and this rearward extension 48 of the tubular sleeve member 47 forms a terminal electrical connection with the forward combination supporting and contact clip member 42 which is mounted on the front supporting section 22 of the casing or housing 16.

The tubular sleeve member 47 of the tip assembly 44 has an inwardly extending rear wall portion 49 which contacts the rear combination supporting and contact clip member 43 and is electrically insulated from the rear wall portion 48 of the tubular sleeve member 47 by a cylindrical insulating member 50. In this manner, the secondary transformer leads 40, 41 are electrically connected to the body of the tubular sleeve 47 and to the rear wall 49 thereof by means of the front combination supporting and contact clip 42 and to the rear combination supporting and contact clip member 43, respectively.

In the new soldering device heating of the tip 45 is accomplished by transfer of heat from the heat-conductive rearwardly extending shank portion 46 of the tip unit 45–46 to the tip 45 itself, and the heat-conductive shank portion 46 is heated by a heating element in the form of an electrical resistance heating coil 51 comprises a highly conductive, small diameter, electrically insulated coated wire, the composition of which will be described in detail hereinafter.

The secondary winding 33 of the transformer 30 is electrically connected, as at 52, to the front end convolution of the electrical resistance heating coil 51 by means of a conductor 54 which is arranged within the tubular sleeve member 47 and extends rearwardly from the heating coil 51 to a point where it terminates in a thin, flared out end section 65 which extends between the inner wall of the tubular sleeve member 47 and the insulating body 50, the spot welding of the sleeve 47 and the insulating body 50 providing a tight electrical terminal connection for the end section 65. In this manner an electrical connection is established between the front end convolution of the electrical resistance heating coil 51 and the rear portion 48 of the tubular sleeve member 47 and the forward resilient combination supporting and contact clip member 42.

The rear end convolution of the electrical resistance heating coil 51 is electrically connected, as at 53, to a conductor wire 55 which extends rearwardly from the electrical heating coil 51 through the center of the insulating body 50 and the rear wall 49 of the tubular housing 47 to which it is electrically connected by soldering 66.

It will thus be seen that the secondary circuit of the transformer unit 30 includes the secondary leads 40, 41, the front and rear combination supporting and contact clip members 42, 43, the conductor leads 54 and 55, and the electrical resistance heating coil 51.

A light bulb socket 56 is mounted in the forward supporting section 22 of the housing 16 and has a small light bulb 27 mounted therein, and the light bulb socket 56 is electrically connected in parallel with the electrical heating coil 51 by means of contact between the light bulb socket 56 and a depending extension 57 of the rear combination supporting and contact clip member 43.

Figure 8:
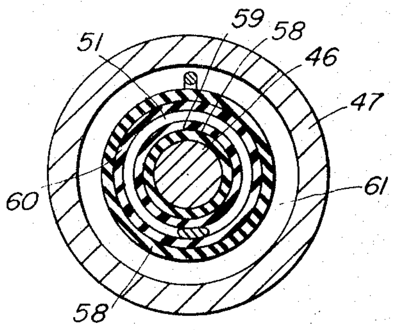
FIG. 8 is an enlarged vertical sectional view of the front portion of the soldering tip assembly on line 8—8 in FIG. 5, showing the electrical heating coil, the heat-conductive shank of the soldering tip arranged therein, and the insulating means surrounding the electrical heating coil.
Figure 9:
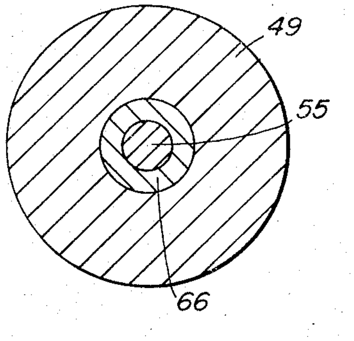
FIG. 9 is an enlarged vertical sectional view of the rear end portion of the soldering tip assembly on line 9—9 in FIG. 5.
Figures 10, 12:
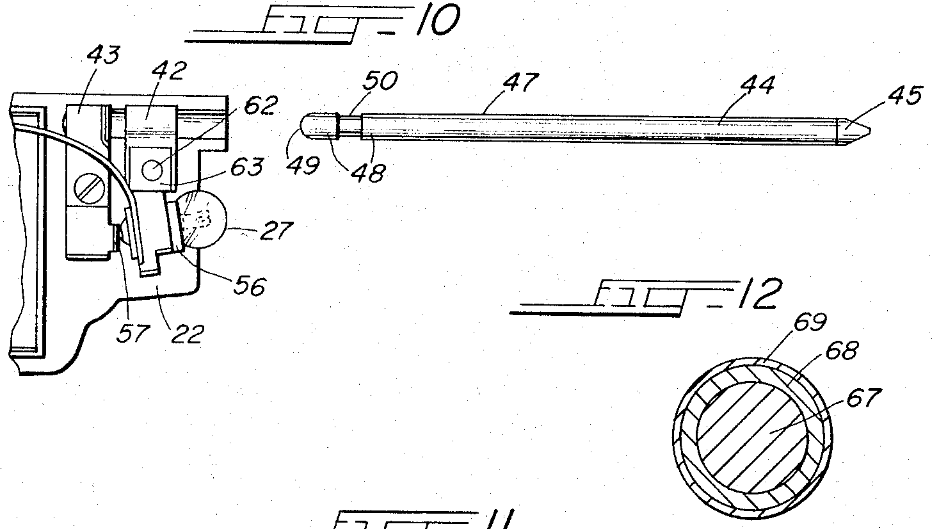
FIG. 10 is a partially exploded fragmentary side elevational view, with portions broken away, showing the tip assembly removed from the front end or supporting portion of the housing and the electrical contacts associated therewith.
FIG. 12 is an enlarged cross-sectional view of the nickel enamel coated wire embodied in the heating coil of the new soldering device.
Figure 11:
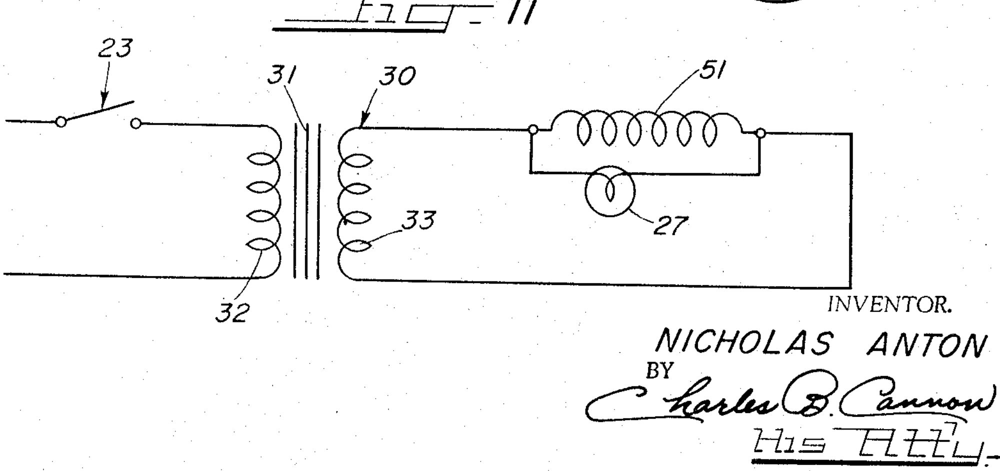
FIG. 11 is a diagrammatic view of the electrical circuit embodied in the new soldering device of the present invention.

The rearwardly extending heat-conductive shank portion 46 of the tip 45 is covered with an electrically insulating material 58 (FIGS. 5 and 8), which may be in the form of a hardenable ceramic composition, and an inner insulating sleeve 59 made of glass fabric, or the like. An outer insulating sleeve 60, of a glass fibre cloth, or the like, covers the exterior of the electrical heating coil 51 and the ceramic insulating material 58 further covers the components, as shown in FIGS. 5 and 8. As is best shown in FIG. 8, the heat-conductive rearwardly extending shank portion 46 of the heating tip 45 is surrounded by concentric layers, respectively, of the insulating material 58, the inner glass fabric cloth 59, the wire heating coil 51, and the outer glass fabric cloth 60, and the ceramic insulating material 58, and an insulating air space 61 is provided between the outer layer of insulation 58 and the tubular sleeve 47.

The electrical heating coil 51 is preferably composed of fine copper wire 67 having a diameter of about .0108 inch, and this wire has a thin nickel coating 68 integrally bonded thereto on the exterior thereof, thereby preventing undue deterioration of the wire due to oxidation or like corrosion of the copper wire incidental to heating thereof, such corrosion being otherwise appreciable in copper wire at temperatures of 450° F. and higher. The corrosion-resistant nickel coating 68 on the copper wire 67 in the heating coil 51 is further covered with a high temperature insulation coating 69 integrally bonded to the corrosion-resistant nickel coating on the outer surface thereof, and which serves as electrical insulation for the heating coil 51.

In the practice of the present invention, it has been found that the coated copper wire 67 of which the electrical heating coil 51 is composed is advantageously a No. 30 nickel clad copper wire with a high temperature electrical insulating coating intimately bonded to the exterior surface thereof. A wire such as this, when enclosed with an encapsulating insulating material of a ceramic character and fused into an integral unit is referred to as an Anaconda CS–1200 system, and this system is described in Anaconda Brochure WC–6356–5M–63, published by the Anaconda Wire and Cable Company, 25 Broadway, New York, N.Y.

The entire front tip assembly 44 is removably mounted in the forward supporting section 22 of the housing 16 by means of a set screw 62 and nut 63 which cooperate with the front combination supporting and contact clip member 42 to retain the forward tip assembly 44 in position of use.

The soldering tip element 45 is press-fitted into the forward portion of the tubular sleeve member 47, thus securing the tip 45 and its rearwardly extending heat-conductive shank portion 46, the tubular sleeve member 47, and the electrical heating coil 51 and associated parts in fixed relation relative to the casing or housing 16 and its forward supporting section 22.

The tubular sleeve member 47 of the forward tip assembly 44 is preferably made of steel or other metal of relatively poor heat transmission characteristics, in contrast to copper, and by reason thereof, a comparatively large proportion of the heat generated by the electrical heating coil 51 will flow from the heat-conductive rearwardly extending shank portion 46 of the tip unit 45–46 to the tip portion 45 thereof whereas a comparatively small proportion of the heat will flow rearwardly in the tubular sleeve member 47 toward the rear end portion thereof and to the combination supporting and contact clip members 42, 43 and the transformer unit 30.

During operation of the new soldering device 15, the cord 29 may be connected to any suitable alternating current source such as a 110 volt domestic current supply line, and when so connected actuation of the trigger 26 rearwardly will cause the rear end portion thereof to engage the movable switch contact member 25 and urge the latter into engagement with the relatively fixed or stationary contact member 24, thus electrically connecting the terminals 24, 25 of the switch unit 23. Current will then flow through the primary transformer leads 38, 39 and the primary winding 32 of the transformer unit 30, thereby inducing a low voltage, high amperage current in the secondary winding 33, of the transformer unit 30. The low voltage, high amperage current thus generated in the secondary winding 33 of the transformer 30 will thereupon flow through the secondary leads 40, 41 through the combination supporting and contact clip members 42, 43, through the conductors 54, 55, and through the heating coil 51 which is thus heated to an elevated temperature, and the heat generated thereby is thereupon transmitted to the rearwardly extending heat-conductive shank 46 of the heating tip 45–46 to the tip portion 45 thereof, and thence to the work.

By reason of the fact that the electrical heating coil 51 is composed of the aforesaid nickel-coated insulated fine copper wire 67, the so-called automatic thermal valve action or regulation of the copper wire 67 in the heating coil 51, tends to stabilize the temperature of the heating tip unit 45–46 at about 1050° F.

It has been found in the use of the new soldering device that the tip portion 45 thereof will heat to a temperature of about 400° F. in about ten seconds and that the heating coil element 51 heats to a temperature of from 900° F. to 1100° F. in about ten seconds. This is regarded as quick heating in the soldering device art, and this is approximately the heating time of the prior soldering guns, but is much faster than the two (2) to five (5) minutes more commonly required to heat the earlier, indirectly heated soldering devices.

In a commercial embodiment of the present invention, the new soldering device utilized a current of about one-half ampere in the initial heating surge and about one-third of an ampere thereafter in continued operation, whereas the heat produced is equal to or greater than that supplied by earlier known soldering devices including those of the so-called soldering gun type using much more current.

It has also been found in the use of the new soldering device, which employs the indirectly heated soldering tip 46–45, that the same is more efficient than prior soldering devices employing a directly heated tip, that is, soldering guns in which the heating tip forms a part of the secondary circuit of the transformer unit.

A modified form of the soldering device of the present invention is generally shown in FIGS. 13 to 18, inclusive. In referring to this embodiment of the invention, like numerals are used to designate parts which correspond to those in the first embodiment of the invention, the numerals of the second embodiment being distinguished therefrom by the addition of the additional and distinguishing reference character "*a*."

Thus, in considering the modified form of the invention, there is shown a second embodiment in the form of a soldering device generally indicated at 15*a* and this comprises a housing 16*a* generally in the form of a pistol and comprising two complementary sections, the left hand section being designated 17*a*.

This housing 16*a* includes a handle section 20*a*, an intermediate transformer housing section 21*a* and a forwardly extending supporting section 22*a* which includes components to be described in further detail hereinafter.

The modified unit also includes an electrical switch unit 23*a* disposed in the handle section, and this switch unit comprises a fixed switch contact member 24*a*, a movable contact switch member 25*a* and two conductors 27*a*, 28*a* for connecting with a cord 29*a* which is adapted to be connected to a 110 volt A.C. line, for example. A reciprocable trigger member 26*a* is movably mounted in the handle section 20*a* for causing the movable switch contact member 25*a* to contact the fixed switch contact member 24*a*.

A step-down electrical transformer unit 30*a* is mounted in the intermediate housing section 21*a* and the transformer unit 30*a* comprises a core 31*a* and large secondary windings 33*a* disposed on the exterior of and surrounding a plurality of turns of wire forming a transformer primary (not shown), the leads for the primary windings being shown, for example, at 38*a* and 39*a*. In this transformer unit 30*a*, the flat surfaces of the core laminations are disposed generally horizontally, while the transformer unit 30 of the earlier embodiment has its core disposed generally vertically.

The transformer unit 30*a* includes a front leg portion 64*a*, a center leg core portion 34*a* and a rear leg core portion 35a as well as a right hand portion 36a and a left hand portion 36b, all the transformer core portions 33a, 34a, 35a, 36a, 36b, and 64a being composed of soft iron or other like material with high magnetic permeability. The primary winding of the transformer 31a contains a large number of windings, and as can be seen by reference to FIG. 14, the secondary winding 33a has a relatively small number of turns of wire of a relatively larger size. The primary winding (not shown) is attached to the switch contact by means of connectors 38a, 39a and thin sheets of insulating material, such as a plastic resinous film of paper 37a are used to insulate the layers of wire windings from each other. Two secondary transformer leads 40a, 41a are used to electrically connect the transformer secondary to the electrical heating coil element which is embodied in the novel soldering tip assembly of the new soldering device, by means to be described hereinafter.

In forming this connection, the first secondary winding lead 40a is connected to a front terminal clip 70, and this front terminal clip 70 is fixedly attached, as by rivet 71, to a terminal mounting plate 72. A central bore 73 is arranged in the mounting clip 70 and a removable fastener in the form of a screw 73a extends downwardly through the terminal clip 70. Access to the screw 73a may be had through a top surface aperture 74. The rear secondary lead 41a connects to a rear terminal clip 75, this clip also being mounted to the plate 72 as by a rivet 76. The aperture 77 in the rear terminal clip is adapted to receive a counterbored terminal connector element 78, the element 78 including a set screw 79 movable therein for firmly engaging the front portion 80 of the secondary lead 41a. The terminal connector element 78 is removably disposed in the rear terminal clip 75 by means of the screw 81. A rear extension 82 of the soldering tip assembly 44a extends into the front portion of the terminal connector 78 where the screw 81 may engage it. A rear upper aperture 83 is provided for access to the screw 81.

It will thus be seen that the front lead 40a terminates in the front clip 70 and the rear lead 41a terminates in the rear clip 75, both clips 70, 75, being fixedly secured to the terminal mounting plate 72. A bottom extension portion 84 connected to one terminal of the light bulb unit 27a while a lower project portion 85 of the rear terminal clip 75 connects to the other contact of the bulb unit 27a. Thus, the bulb 27a is wired parallel to the terminal clips 70, 75, and it functions in the same manner as the bulb 27 in the first embodiment.

Figures 15, 16, 17, 18:
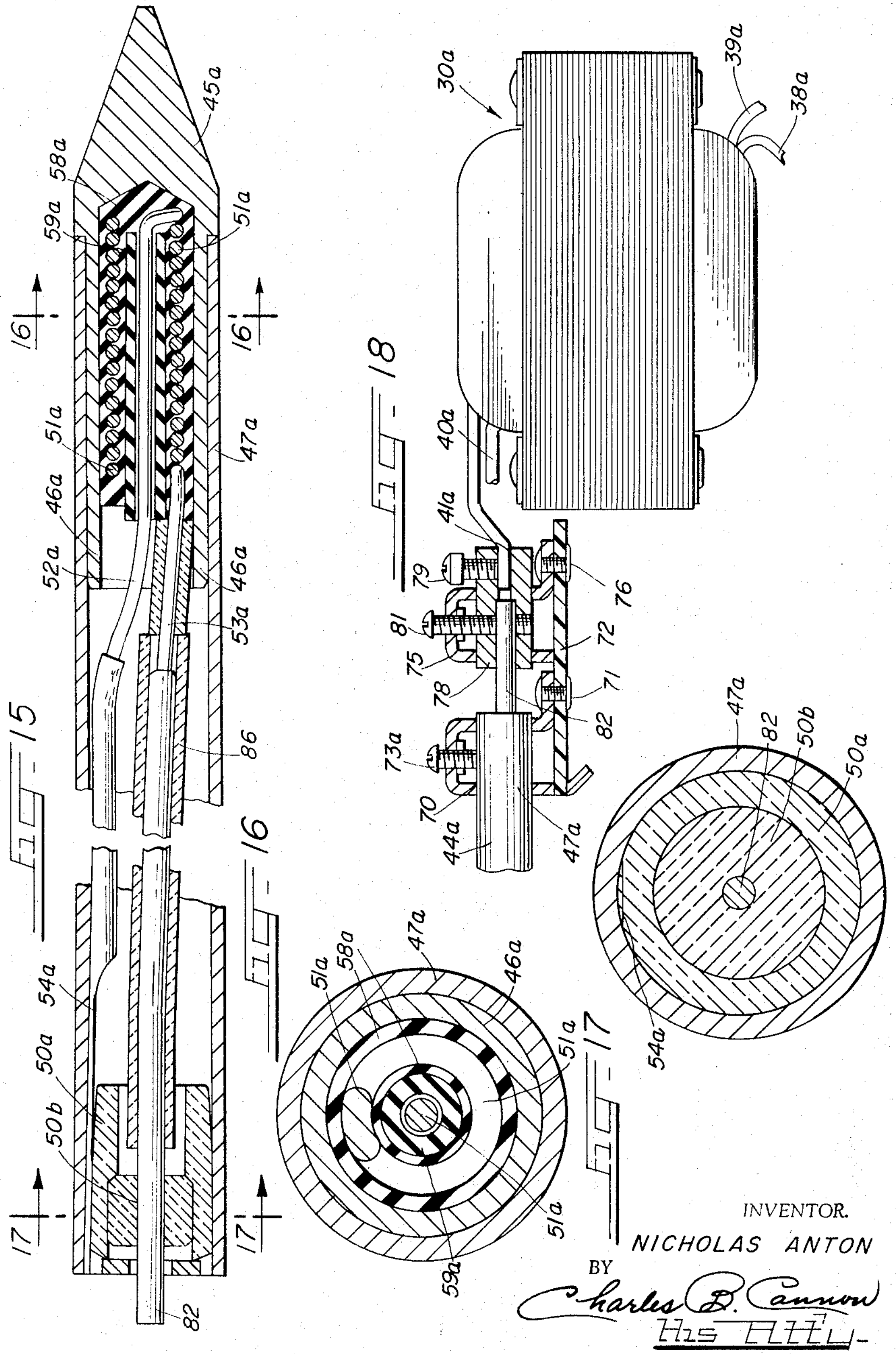
FIG. 15 is a greatly enlarged vertical sectional view, with portions broken away, of the soldering tip assembly used in the modified unit of FIG. 13.
FIG. 16 is a greatly enlarged vertical sectional view of the soldering tip assembly of FIG. 15 and taken along lines 16—16 thereof.
FIG. 17 is a greatly enlarged vertical sectional view of the rear end portion of the soldering tip assembly of FIG. 15, taken along lines 17—17 thereof.
FIG. 18 is an enlarged side elevational view, partly in section, showing the construction of the terminal clips and electrical connections for the soldering tip and showing the transformer unit of the modified form of the invention shown in FIG. 15.

The modified form of the tip assembly 44a used in the second embodiment of the invention, as best shown in FIG. 15. This figure illustrates the front end portion 45a of a soldering tip including a rearwardly extending cylindrical portion 46a, which is press-fitted into the tubular sleeve 47a, and this tip unit is distinguished from the tip unit of the first embodiment insofar as the rearwardly extending portion 46a thereof is of a hollow cylindrical construction and does not have a solid center section such as the shank 46 of the tip 45. Disposed inside the cylindrical portion 46a of the tip 45a is a coil 51a of a number of turns of a No. 20 (0.032″) nickel clad copper heating element wire. Electrical insulation 58a is provided to prevent contact between the wires 51a and the rear extension 46a of the tip 45a, and a fiber glass insulating sleeve 59a surrounds the exterior of the insulated lead-in portion 52a which forms one connection to the coil 51a. The other end of the coil is connected by an insulated lead 53a for conducting current to the rear of the tip assembly 44a through the central conductor 55a. A large exterior lead 54a is in intimate electrical contact with the tubular portion 47a of the tip assembly 44a, and an insulator bead 50a and an inner insulator sleeve 50b prevent electrical contact between the two wire leads 54a, 55a and thus isolates the central conductor 55a from the exterior tubular sleeve 47a of the tip assembly 44a. The conductor 54a and 55a are much larger in cross section than are the turns of the coil 51a, and, as a result, such conductors 54a, 55a have much less resistance than the wire comprising the coil. An extra insulating sleeve 86 is provided to prevent the interior conductor 55a from short circuiting the heating element. A rearwardly extending portion 82 of the central conductor 55 is adapted to be received in the terminal member 78, as referred to above, to make electrical contact therewith, while the exterior portion 47a of the tip assembly 44a makes contact with the front terminal clip 70.

Figures 13, 14:
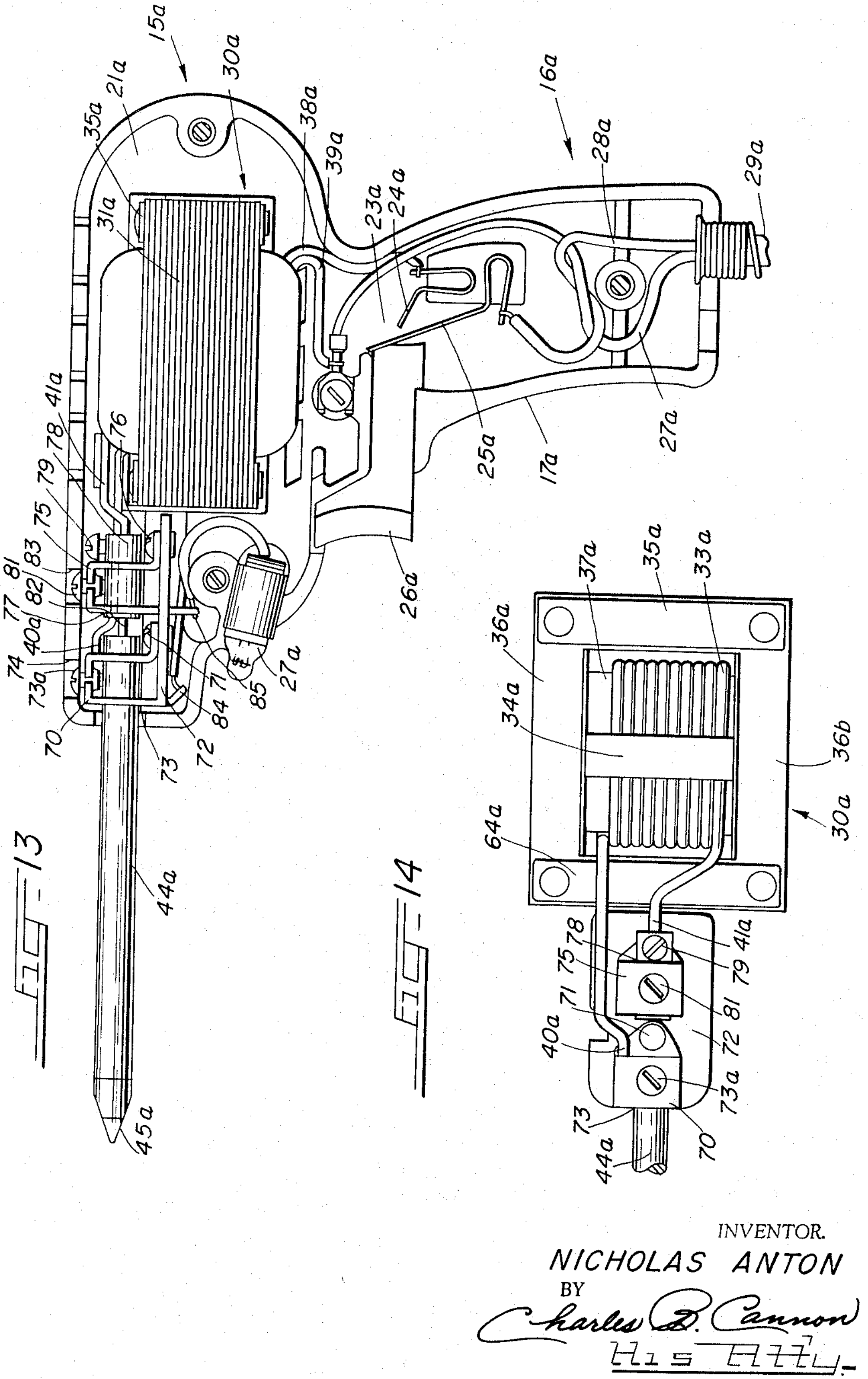
FIG. 13 is a side elevational view of a different form of the soldering device of the present invention shown with part of the housing removed to illustrate the internal construction of the soldering device.
FIG. 14 is a top plan view of the transformer and the terminal clip assembly of the modified unit shown in FIG. 13.

The operation of the modified form of the soldering device shown generally at 15a is essentially the same as the operation of the first embodiment shown at 15 in FIG. 1, for example. However, the unit shown in FIG. 13 is somewhat larger, that is, the secondary winding 33a and the leads 40a, 41a therefor, are larger. Likewise, the diameter of the wire used in the coil 51a is larger, and, as a result, the second unit has a greater heat capacity and is somewhat heavier in weight.

The main differences in the two units reside in the constructions of the tip assemblies and the connections therefor. Thus, referring to FIG. 15 it will be noted that the rearwardly extending portion 46a of the tip 45a is in the form of a hollow cylinder in which the heating coil unit is disposed, whereas in the first embodiment of the invention, the rearwardly extending portion 46 of the tip 45 is in the form of a solid, central, narrow-diameter shank with the heating coil surrounding the shank portion 46. In both cases, however, the insulating material used is similar, namely, fiber glass sleeves and a fusible ceramic compound, for providing electrical insulation, as well as for locating the coil in a fixed position relative to the tip.

In considering the rear end portions of the two soldering tip assemblies 44, 44a, it will be noted that the tip assembly 44 has a rear contact portion 49 which is the same diameter as the forward tubular element 47, whereas, in the second form 44a of the tip assembly, a rear extension portion 82 forms the second electrical contact, but this rear extension 82 is much smaller than the diameter of the tubular element 47.

It will also be noted that the construction of the forwardly extending supporting sections 22, 22a, and the elements contacted therein, differ somewhat in the mode of construction. Thus, in the first embodiment of the invention, the contact is made by vertically extending clips 42, 43, whereas in the second embodiment, electrical contact is made with the tubular portion 47a by means of the U-shaped clip 70 with the central bore 73 disposed therein, and the connection to the rear extension 82 is accomplished by the insertion thereof into the terminal connector element 78. In the first embodiment, both clips 42, 43 are secured directly to the plastic body portion 18, whereas, in the second embodiment, the connector clips are fixedly riveted to the clip base 72. Thus, in the second embodiment, the electrical connection is made directly by contact screws, whereas, in the first embodiment, the clips are held against the tip assembly by their innate resiliency. Each unit, therefore, includes an inner or centrally disposed conductor wire, an outer conductor wire electrically contacting the tubular element 47, 47a, and a central heating elements or coils 51, 51a and a front soldering tip 45, 45a, a portion of which 46, 46a is in intimate heating exchange relation with the heating element 51, 51a.

Thus, in the present invention, it is possible to provide a heating tip of suitable heat capacity without making it of the very thin cross-section required in the heating tips of the prior soldering devices or guns in which the heating tip is a part of the secondary circuit of the transformer.

Moreover, the cross-section of the nickel-coated wire 67 in the heating coils 51, 51a may be made much smaller than the cross-section of the conductor leads 54–55, 54a, 55*a* thereto, thereby concentrating the heat in the region of the tip 45, 45*a*, while at the same time, it is not necessary to use large, heavy and expensive and highly heat-conductive secondary coil windings and leads.

A further advantage of the present invention resides in the fact that since the tip assemblies 44, 44*a* and the electrical heating coils 51, 51*a* embodied therein are supported by the tubular steel sleeve member 47, 47*a* at a considerable distance, such as four (4) to six (6) inches, from the transformer units 30, 30*a*, transfer of substantially all harmful heat to the transformer units 30, 30*a* is prevented, whereas, in the prior art soldering guns the heating tips composed of copper were commonly connected by large copper leads or straps to the transformer unit, thereby resulting in considerable undesirable heat transfer from the tip back through the large copper conductors and to the transformer unit.

It has been found that the heat insulation embodied in the first embodiment, for example, of the new soldering device is such that it is possible for the user thereof to hold his fingers on the rear portion of the tubular metal sleeve member 47 of the forward tip assembly 44 without burning them, while, at the same time, melting ordinary solder with the heating tip 45–46, thus indicating the extent to which the heat generated by the heating coil 51 is concentrated in the desired region, namely, in the forward tip unit 45–46.

It has also been found in the practice of the present invention that the use of the relatively thin electrical conductors 54–55 to the heating coil 51 makes it possible to employ a forward tip assembly 44 of the relatively small diameter such, for example, as three-sixteenths (3/16) of an inch or less, and this greatly facilitates insertion of the heating tip assembly 44 into places which are either inaccessible or are accessible only with difficulty, such as are encountered in soldering electrical circuitry, and this enhances the utility of the new soldering device for use in soldering delicate electronic devices, and for other purposes.

In both of the soldering pistols described in detail above, an electrical step-down transformer unit 30, 30*a* is shown as the source of the current used to heat the heating coil 51, 51*a* of the soldering tip 45, 45*a*. However, as is well known in the art, a transformer unit is not the only suitable means for producing a heating current, required to heat the heating coil units 51, 51*a*. Thus, referring to FIGS. 21 through 25, inclusive, there are shown various known equivalents which are operable to produce a heating current in the heating coil units 51, 51*a*. Such equivalent circuits are referred to generally as electrical energy transfer circuits or current drive circuits or electrical drive means, all of such circuits having the object of transferring a line current or like energy into a preferred form for use in heating the wire heating unit 51.

It referring to these figures, and in the discussion below, it will be appreciated that the heating coil units 51, 51*a* is shown as a resistor even though, in physical specimens of the soldering gun, the resistance or heating wire itself is in the form of a coil. Thus, although the heating elements 51, 51*a* are in the form of a coil, they operate as electrical resistors and do not contribute substantial inductance to the electrical circuits of which they form a part.

Figure 21:
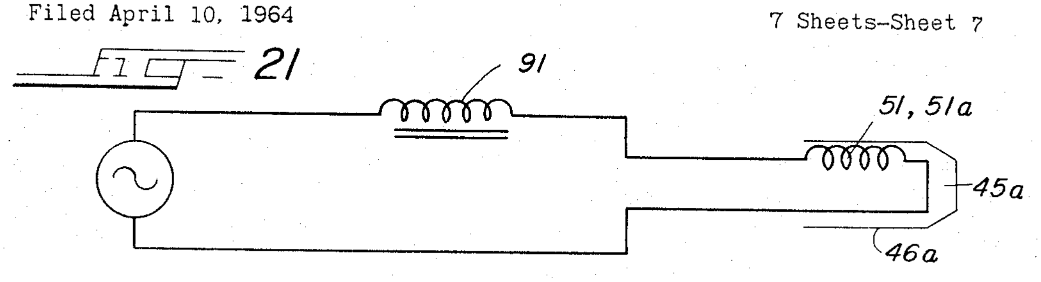
FIG. 21 is a schematic view of the electrical circuitry of a modification of the present invention.

Thus, referring, for example, to FIG. 21, there is schematically shown an alternating current source 90, and, disposed in series with the resistance 51, 51*a* is an inductance 91 which is adapted to resonate with the alternating current impressed in the circuit and maintain heating current flowing through the resistor 51 or 51*a*, the result being, for example, a heating of the rear tip extension 46*a* and the tip 45*a*.

Figure 22:
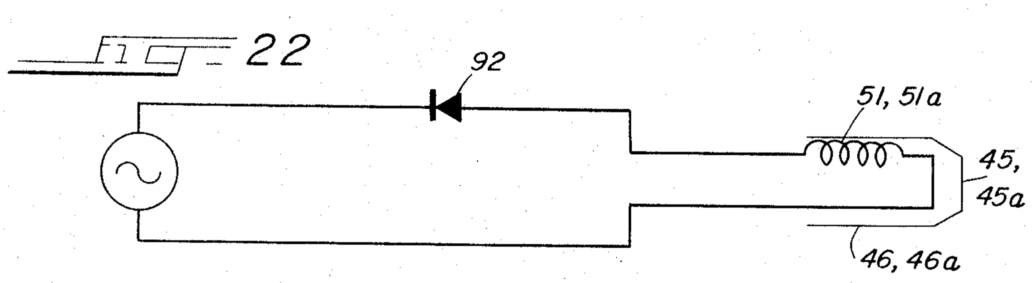
FIG. 22 is a schematic view of the electrical circuitry of a modified form of the present invention.

Likewise, the tip 46, 46*a* shown in FIG. 22 may be heated by its current resistance 51, 51*a* when a diode-rectifier 92 is placed in series with the resistance 51, 51*a* and attached to one portion of the heating circuit to provide a pulsating direct current in the heater element.

Figure 23:
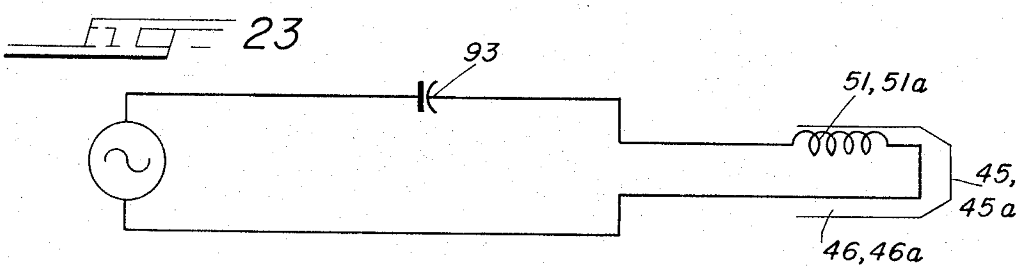
FIG. 23 is a schematic view of the electrical circuitry of an alternate form of the present invention.

Another form of the invention provides for the inclusion of a resonantly tuned capacitor 93 in the alternating current circuit, whereby the alternating current flowing in the resistor 51, 51*a* will heat the rear end portion 46, 46*a* of the soldering tip 45, 45*a*, as depicted in FIG. 23, for example.

Figure 24:
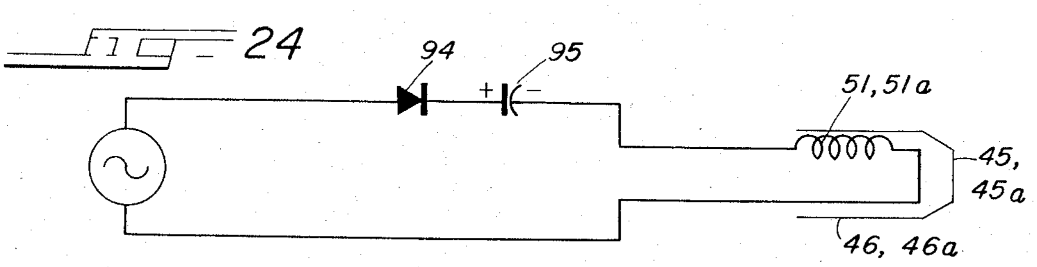
FIG. 24 is a schematic view of the electrical circuitry of a further modified form of the present invention.

Referirng to FIG. 24, there is shown another electrical circuit which is operable to heat the resistance 51, 51*a* and the rear portion 46, 46*a* of the tip 45, 45*a*. This circuit is shown to include not only a diode 94, but also, in series therewith, a tuned capacitor 95.

Figure 25:
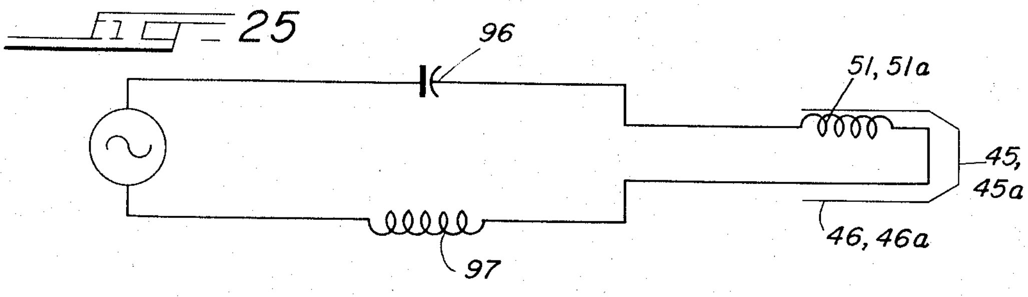
FIG. 25 is a schematic view of the electrical circuitry of still another modified form of the present invention.

FIG. 25 shows another electrical circuit designed to heat the resistor 51*a* and the rear end portion 46*a* of the soldering tip 45*a*. This circuit being a familiar inductance-capacitance circuit sometimes referred to as a "tank" circuit in which high voltage is built up in the "tank" circuit as a small current is supplied to the circuit in phase with the current resonating in the tank circuit. Such an effect is brought about by the correct combination of a capacitor 96 of suitable capacitance with a coil 97 of suitable inductance, as is well known in the art.

In referring to the schematic diagrams illustrated in FIGS. 21 to 25, inclusive, it will be noted that these electrical circuits store up electrical energy by the use of inductance and/or capacitance. The use of either or combination of these reactive components is primarily useful for voltage dividing when a load is designed to operate from a constant voltage source such as normal A.C. power. This necessary voltage dividing function can be accomplished by the use of half-wave or full-wave rectification since resistance of the load is comparable to the internal resistance of the solid state rectifiers.

Figure 19:
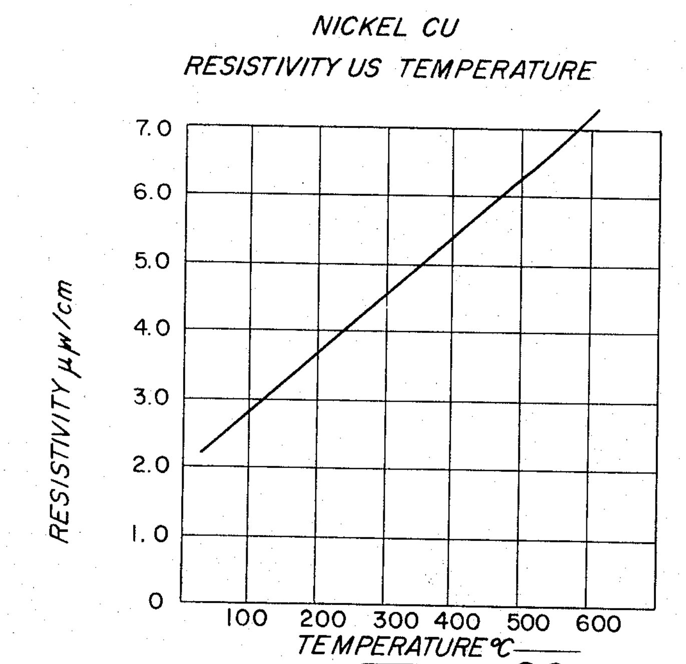
FIG. 19 is a graph which illustrates the relation of resistivity and temperature of the nickel coated copper heating wire of the present invention.
Figure 20:
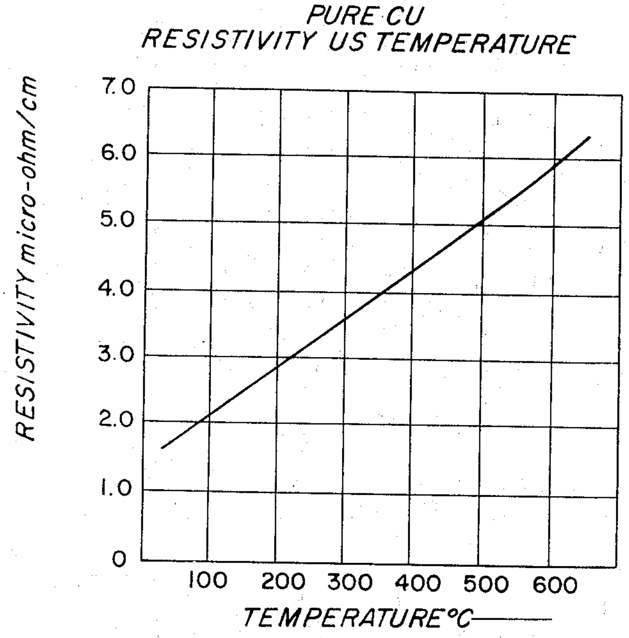
FIG. 20 is a graph showing the relation of resistivity and temperature in pure copper wire.

Referring to FIGS. 19 and 20, it may readily be seen that the resistance of both pure copper and the nickel clad copper wire increase with temperature, and the property shown in these graphs is the property which accounts for the so-called automatic thermal regulation or automatic valve action feature of such copper or nickel clad copper resistance units.

Another advantage which is preserved in both embodiments of the present invention resides in the fact that the automatic valve action or thermal regulation feature of copper is preserved in the forward tip assembly 44 while, at the same time, it is not necessary to limit the shape of the tip assembly 44, 44*a* or the tip 45–46, 45*a*, 46*a* to a tip of an undesirably small diameter. Thus, the new soldering device has the desirable characteristic of providing suitable heat capacity in the tips 45–56, 45, 46*a*, such as was obtainable in the prior indirectly heated soldering devices while, at the same time, the new units have, in addition to the quick heating characteristics and other advantages of the directly heated prior soldering devices, the further advantage of being economical in manufacture and use. Such new units, however, have none of the disadvantages of the older soldering devices.

A further advantage of the present invention resides in the fact that by reason of the novel construction of the forward tip assembly 44 the parts which may require replacement, namely, the tip unit 45–56 and the heating coil unit 51, are both replaceable economically and as units, whereas the other parts of the new soldering device have substantially unlimited life expectancy in use.

As disclosed herein, nickel is the preferred material for cladding the copper in the nickel-clad copper heating unit, but other materials resistant to the action of high temperatures may also be used to clad the copper conductor material.

It will thus be seen from the foregoing description, considered in conjunction with the accompanying drawings, that the present invention provides a new and improved electrical soldering device and that the invention thus has desirable advantages and characteristics, and accomplishes its intended objects, including those hereinbefore pointed out and others which are inherent in the invention.

It will be appreciated that persons skilled in the art may make certain variations and modifications of the present invention without departing from the spirit of the invention or the scope of the appended claims.

I claim:

1. An electrically heated soldering device comprising, in combination,
 (1) electric current supply means, including means for connecting said electric current supply means to an electrical current source,
 (2) electrical lead means for connecting said electrical current supply means to a heating tip assembly and
 (3) a heating tip assembly, including
  (a) a principal supporting member including a front end portion, a rear end portion, and an intermediate portion,
  (b) a soldering tip of a highly thermally conductive material fitted in said forward end of said supporting member,
  (c) a heating unit composed of nickel-clad copper conductor material disposed in intimate heat exchange relation with said tip,
  (d) two electrical conductor means for supplying current to said heating unit from the rear end portion of said supporting member; and
  (e) terminal means as said rear end portion of said supporting member and connected to said conductors, for connection with said electrical lead means to supply a heating current to said heating unit, said principal supporting member providing substantial heat insulation between said front end portion of said supporting member and said rear end portion thereof, said heating unit being of much smaller cross-sectional area than said conductor means, and said heating tip being of a much greater mass and heat storage capacity than said heating unit.

2. An electrically heated soldering device as defined in claim 1 which includes a housing having a front end portion and in which one of said two electrical conductor means comprises
 (a) a wire connected to the rear end portion of said principal supporting member; and
 (b) said other conductor means comprises
  (1) a wire insulated from said rear end portion of said principal supporting member, and connected to and terminating in a rearward extension of said principal supporting member;
  (2) said rear end portion and said rearward extension being electrically insulated from each other;
 (c) and in which said terminal means comprises
  (1) two clip units mounted on the said front end portion of the said housing and including
   (*a*) one clip unit for electrically connecting said rear end portion to said electrical lead means; and
   (*b*) another clip unit for connecting said rearward extension portion to said electrical lead means;
  (2) said clip units contacting and removably retaining said principal supporting member in place.

3. An electrically heater soldering device as defined in claim 1 which includes a housing having a front end portion and in which
 (a) one of said two electrical conductor means comprises
  (1) a wire electrically connected to said rear end portion of said supporting member, and the other of said electrical conductor means comprises
  (2) a wire extending through the said rear end portion of said principal supporting member; said other electrical conductor being
  (3) electrically insulated from said rear end portion of said principal supporting member; and in which said terminal means comprises
 (b) a first clip unit surrounding and supporting said rear end portion of said principal supporting member and electrically connected thereto; and
 (c) a second clip unit surrounding said other conductor in electrical contact with said other conductor;
 (d) said first and second clip units being
  (1) electrically insulated from each other, said first and second clip units each including
  (2) means for allowing said rear end portion of said supporting member and said second conductor to be removed from said clip units.

4. A soldering device comprising a housing having therein an electrical step-down transformer unit, manually-controlled switch means carried by said housing for controlling current flow through said transformer, a heating tip assembly comprising a tubular member carried by said housing and projecting forwardly thereof, a heating tip unit carried by said tubular member and including a tip portion projecting forwardly of said tubular member and a heat-conductive portion extending rearwardly from the said tip portion of the said heating tip unit into the body of said tubular member, an electrical heating coil composed of nickel-clad copper conductive material, arranged in the said tubular member and disposed closely adjacent said rearwardly extending heat-conductive portion of the said heating tip unit in heat exchange relationship therewith, means electrically insulating the said electrical heating coil from the said tubular member, and means electrically connecting the said electrical heating coil with the secondary winding of said transformer.

5. A soldering device as defined in claim 4 in which the said electrical heating coil has an outer coating of flexible ceramic material integrally bonded to said nickel-clad copper conductor material on the outer surface of the latter.

6. A soldering device as defined in claim 4 in which the said means for electrically connecting the said heating coil to the secondary of said transformer includes, for one end of said heating coil, the said tubular member and an electrically conductive member having a rear end portion electrically connected to the said tubular member on the inner surface of said tubular member and extending longitudinally in the said tubular member and terminating in a forward end portion electrically connected to the said electrical heating coil and for the other end of said coil, an electrical conductor extending longitudinally in the said tubular member and having a front end portion electrically connected to the said electrical heating coil and having a rear end portion electrically connected to the said secondary of the said transformer unit and electrically insulated from the said tubular member.

7. An electrically heated soldering apparatus comprising, in combination, a housing including
 (1) a handle portion having therein
  (a) switch means;
  (b) conductor means controlled by said switch means and adapted to be connected to a current source;
 (2) a central body portion having therein
  (a) a step-down transformer including
   (1) primary leads connected to said switch means, and
   (2) a secondary circuit including a secondary winding and secondary leads extending forwardly of the said central portion of said housing;

(3) a front housing portion having therein terminal clip means connected to said secondary leads;

(4) a tip assembly unit removably fastened to said terminal clip means and including (a) a soldering tip located at the forward end portion of said tip assembly unit;

(b) an electrically insulated heating element for said soldering tip composed of nickel-clad copper conductor material and disposed in the said forward end portion of said tip assembly unit in intimate heat exchange relation with said soldering tip;

(c) terminal members disposed at the rear end portion of said tip assembly unit for connection with said clip means and said tip assembly, and said tip assembly unit including (d) an intermediate portion having therein means for electrically connecting the said terminal members with said heating element and for preventing heat transfer from said soldering tip rearwardly to said transformer unit.

8. A tip assembly for an electrically heated soldering device of the type which includes a housing having therein a transformer unit, and manually operable means for energizing the said transformer unit, said tip assembly comprising a tubular member, a tip unit arranged at one end portion of said tubular member and including a tip portion and a rearwardly extending heat-conductive portion extending from the said tip portion of the said tip unit into the body of the said tubular member, an electrical heating coil composed of nickel-clad copper conductor material arranged in the said tubular member and disposed closely adjacent to the said heat-conductive rearwardly extending portion of the said tip unit in heat exchange relationship therewith, means electrically insulating the said electrical heating coil from the said tubular member, and first and second electrical conductors carried within the said tubular member for electrically connecting the said electrical heating coil with the said secondary circuit of the said transformer.

9. A tip assembly as defined in claim 8 which includes means for electrically connecting one of the said electrical conductors to the body of the said tubular member at the rear thereof, and which includes means for electrically insulating the said other of the said electrical conductors from the body of the said tubular member.

10. An electrically heated soldering device comprising, in combination, (1) electric current supply means;

(2) a heating tip assembly, comprising (a) a supporting member including a front end portion;

(b) a soldering tip of a highly thermally conductive material carried by the said front end portion of said supporting member;

(c) a heating unit composed of nickel-clad copper conductor material and disposed in intimate heat exchange relation with said soldering tip; and (3) means for connecting said electric current supply means to said heating unit.

11. An electrically heated soldering device as defined in claim 10 which includes means for connecting the said electric current supply means to a current source.

References Cited by the Examiner

UNITED STATES PATENTS

| | | | |
|---|---|---|---|
| 1,749,396 | 3/1930 | Schylander | 219—239 |
| 1,820,799 | 8/1931 | Hazlett et al. | 219—237 X |
| 2,056,951 | 10/1936 | Bohall et al. | 219—236 X |
| 2,167,389 | 7/1939 | Kuhn et al. | 219—237 X |
| 2,515,781 | 7/1950 | Lennox | 219—237 X |
| 2,588,531 | 3/1952 | Johnson | 219—239 |
| 2,619,576 | 11/1952 | Greibach | 219—237 X |
| 2,709,743 | 5/1955 | Mitchell | 219—238 |
| 2,814,712 | 11/1957 | Fulmer | 219—240 |
| 3,002,077 | 9/1961 | Caliri | 219—229 X |
| 3,023,295 | 2/1962 | Johnson | 219—237 X |

FOREIGN PATENTS

| | | |
|---|---|---|
| 143,592 | 11/1935 | Austria. |
| 405,280 | 8/1943 | Italy. |

ANTHONY BARTIS, *Primary Examiner.*